March 23, 1926.
E. C. WALKER
PRESSURE REGULATOR
Filed Nov. 8, 1920
1,577,625
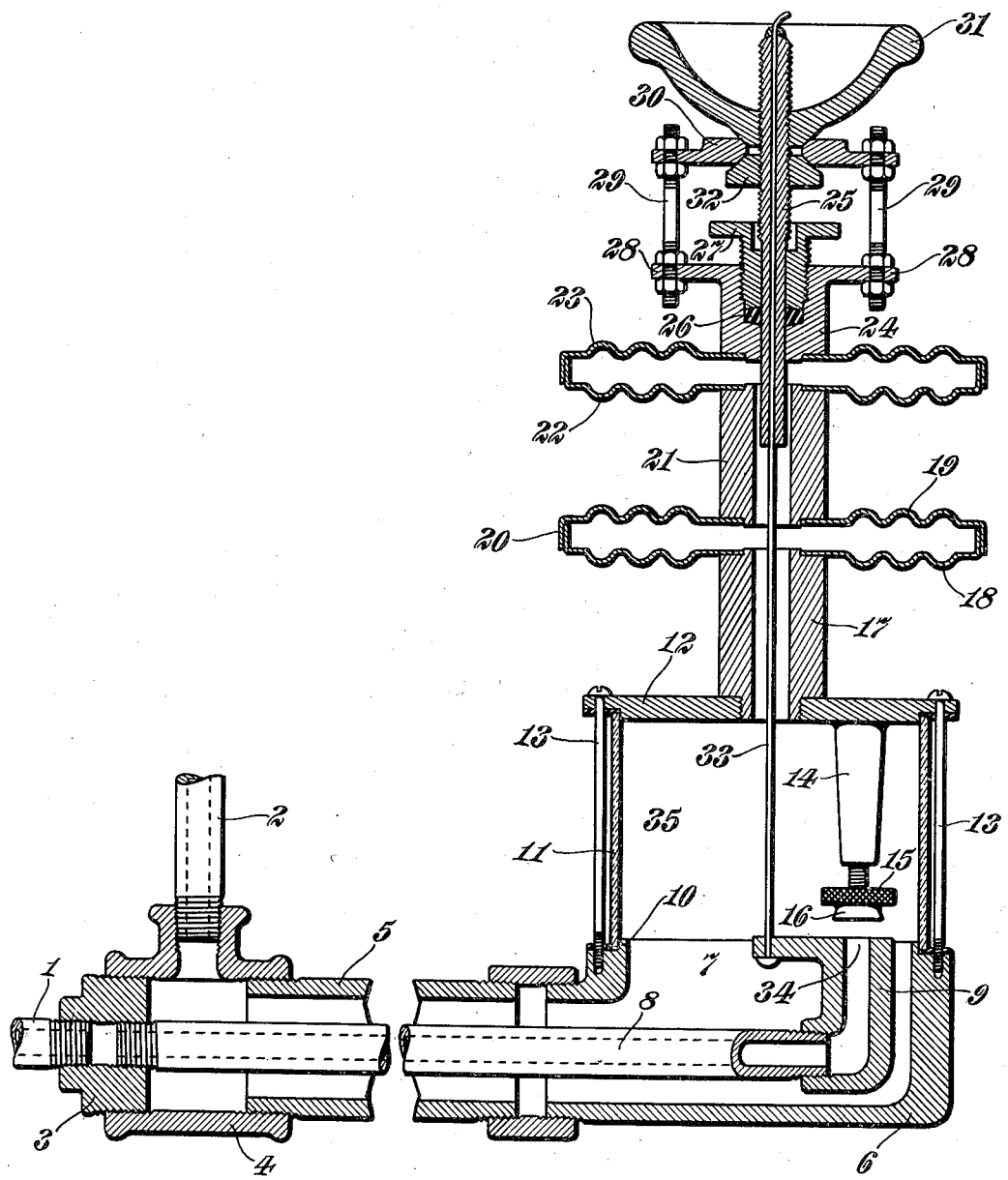
INVENTOR:
EDWARD C. WALKER,
BY
John H. Bruninga
HIS ATTORNEY.

Patented Mar. 23, 1926.

1,577,625

UNITED STATES PATENT OFFICE.

EDWARD C. WALKER, OF KINLOCK, MISSOURI, ASSIGNOR TO NATIONAL LEAD COMPANY, OF NEW YORK, N. Y., A CORPORATION OF NEW YORK.

PRESSURE REGULATOR.

Application filed November 8, 1920. Serial No. 422,684.

*To all whom it may concern:*

Be it known that I, EDWARD C. WALKER, a citizen of the United States, and residing at Kinlock, county of St. Louis, Missouri, have invented the new and useful Improvement in Pressure Regulators, of which the following is a specification.

This invention relates to a device for controlling the pressure and flow of a gas, liquid or other fluid. It is intended primarily for use in connection with the welding machine described in Patent No. 1,371,833, patented March 15, 1921, but its use is by no means confined to such a machine, as this device is adaptable for use anywhere where it is desired to maintain a fluid under uniform pressure or to regulate the flow thereof to a uniform rate.

In the operation of the machine, described in the above mentioned application, it is important to have the movement of one of the elements regulated to a high degree of accuracy, which is done by controlling the flow of fluid in a hydraulic regulating device.

One of the objects of this invention, therefore, is to provide means by which the flow of a fluid may be controlled and accurately regulated.

Another object of this invention is to provide means whereby a fluid supplied at a certain pressure may be reduced in pressure and said reduced pressure accurately controlled.

Another object of this invention is to provide means whereby the pressure of a flowing fluid may be regulated with a high degree of nicety.

Further objects will appear from the detail description taken in connection with the accompanying drawing, in which:

Figure 1 is a sectional view through the center of a device showing one embodiment of this invention.

Referring now to the drawing, 1 designates a supply pipe by means of which the fluid is brought to the device, and 2 designates the delivery pipe by means of which the fluid is carried away. The supply pipe 1 is screwed into a plug 3 which in turn is screwed into a fitting 4. A pipe 5 is screwed into the other side of the fitting 4 and is attached at its other end to a special fitting 6 having a chamber 7 preferably circular in shape. A long tube 8 has one end screwed into the plug 3 and carries its other end, an upwardly directed nozzle 9, said nozzle lying within the chamber 7.

The upper face of the fitting 6 may be flanged as shown at 10 and a short cylindrical glass tube 11 fitted to said flange. The tube 11 is closed at the top by a plate 12 similarly flanged to fit said tube. The tube 11 may be clamped between the fitting 6 and the plate 12 by means of the screws 13 so as to make fluid-tight joints.

The plate 12 carries a downwardly extending supporting member 14 into the lower end of which is screwed a thumb screw 15 having a head 16 disposed opposite but spaced from the opening of the nozzle 9 so as to form a baffle disposed in the fluid stream issuing from said nozzle.

The plate 12 has an opening into which is fitted a short upright tube 17 which carries at its top a corrugated diaphragm 18 which in turn carries a similar, but inverted diaphragm 19. The diaphragms 18 and 19 are provided with flanges 20 arranged to nest one within the other and said flanges are brazed or otherwise securely fastened together so as to form a fluid-tight joint. The upper flange 19 carries a second short upright tube 21 similar to the tube 17. The joints between the tubes 17 and 21 and the diaphragms 18 and 19 are preferably made by brazing, or other secure and reliable means.

The tube 21 carries a pair of diaphragms 22 and 23 similar in all respects to the diaphragms 18 and 19.

The upper diaphragm 23 carries a member 24 bored to accommodate the vertical tube 25 and provided with a packing space 26 and a gland 27 to form a stuffing box through which the tube 25 may slide. The member 24 is also provided with extended flanges 28 arranged to support adjustable posts 29 carrying a plate 30 at their upper ends. The plate 30 is taper bored above and below to accommodate the adjusting nut or hand wheel 31 and the lock nut 32. The adjusting nut 31 and the lock nut 32 engage the threaded end of the tube 25 and are adapted to center said tube in the bore of the plate 30 and to lock it thereto. A member 33 consisting of a rod or wire is attached at its lower end to a lug on the nozzle 9 and passes up through the bore of the tube 25, being soldered to said tube at the top. This construction is for convenience in making preliminary adjustments. The length of the member 33 is roughly adjusted by drawing it through the tube 25 and then soldering it thereto when the desired adjustment has been attained. Finer adjustment may thereafter be obtained by means of the nut 31.

The operation is as follows:

The fluid entering at the supply 1, passes through the tubular member 8 and issues in a directed jet from the orifice 34 in the nozzle 9. Upon so issuing, the fluid enters and fills up the chamber 7 which includes the spaces between the diaphragms 18 and 19, and 22 and 23. The fluid leaves said chamber by means of the pipe 5 and the delivery pipe 2.

It will be seen that an increase in fluid pressure in the chamber 7 will have the effect of distending the diaphragms 18, 19, 22 and 23, thereby lifting through its connected parts, the connection 33 which in turn raises the nozzle 9 toward the valve 16 by bending the tubular member 8. It will be seen that the parts thus move to vary the distance of the baffle 16 from the orifice 34, thereby influencing the directed jet of fluid by reaction therein so as to again reduce said pressure. The action in this case is not a throttling action, such as is ordinarily used in pressure regulators. In a throttling device the rate of flow is controlled by controlling the area of the orifice through which the fluid passes. In the present case the controlling of the flow depends upon the reaction within the jet of fluid itself whereby the flow in the jet is altered in accordance with the position of the baffle 16. In normal operation this baffle is spaced a considerable distance from the jet, a distance greater than would be allowable if the control were entirely by throttling action, in order to get an equal regulating effect. As is well known, when a jet of fluid issues from a nozzle at a considerable velocity, the interposition of any obstacle in the path of the jet, after issuing from the nozzle, will immediately be felt within the nozzle itself. This is due to an alteration in the kinetic energy of the flowing stream due to impact on the obstacle. The reaction travels backward from the obstacle along the stream and into the nozzle itself where it acts to retard the flowing stream. There is thus an actual regulation of the flow from the jet, in accordance with the distance of the obstacle from the mouth of the jet. By these means the fluid pressure in the chamber 33 may be maintained uniform and at a value, the difference between which and the value of the supply pressure will be greater or less according to the adjustments of the valve 16 and the adjusting nut 31.

It has been found in practice that with this device the flow of fluid therethrough can be regulated to a high degree of nicety. To gain very accurate control, two or more of such devices may be used in series. With two regulators in series, an accuracy of control of the outlet pressure and also of the flow of the fluid, of one-tenth of one percent has been obtained in practice even with a very wide variation in pressure in the supply pipe 1.

It is obvious that various changes may be made in the details of construction without departing from the spirit of this invention; it is, therefore, to be noted that this invention is not to be limited to the specific details shown and described.

Having thus described this invention, what is claimed is:

1. A fluid controlling device, comprising, a casing, a nozzle therein adapted to form a directed jet of the fluid, a yielding support for said nozzle, a baffle in said casing permanently spaced from the outlet of said nozzle and in the path of and covering a substantial area of said jet, and pressure responsive means connected with said nozzle adapted upon variation of pressure to move the same in order to vary the reaction of the impinging jet, whereby the rate of flow is altered for regulating the pressure of the fluid.

2. A fluid controlling device, comprising, a casing, a nozzle therein adapted to form a directed jet of the fluid, a flexible arm supporting said nozzle, a baffle in said casing permanently spaced from the outlet of said nozzle and in the path of and covering a substantial area of said jet, pressure responsive means connected with said nozzle adapted upon variation of pressure to move the same in order to vary the reaction of the impinging jet, whereby the rate of flow is altered for regulating the pressure of the fluid, and means for adjusting the spacing of said baffle.

3. A fluid controlling device, comprising, a casing, a nozzle and a cooperating baffle therein, and a pipe supported at one end and carrying said nozzle at its free end, said nozzle being movable with said pipe in order to control the flow.

4. A fluid controlling device, comprising, a casing, a nozzle and a cooperating baffle therein, and a flexible pipe fixed at one end and supporting said nozzle at its free end, said nozzle being movable with said pipe in order to control the flow.

5. A fluid controlling device, comprising, a casing, a nozzle thereon adapted to form a directed jet of the fluid, a baffle in said casing spaced from the outlet of said nozzle and in the path of and covering a substantial area of said jet, and a pipe supported at one end and carrying said nozzle at its free end, said nozzle being movable with said pipe in order to control the flow.

In testimony whereof I affix my signature this 13th day of September, 1920.

EDWARD C. WALKER.